Feb. 18, 1969   J. E. BERGSTRÖM   3,427,844
PROCESS AND AN APPARATUS FOR THE MANUFACTURING OF SPIRAL DRILLS
Filed April 23, 1963

JOHAN ERIK BERGSTROM
INVENTOR.

BY
ATTORNEY.

Fig. 8. Fig. 9. Fig. 10.
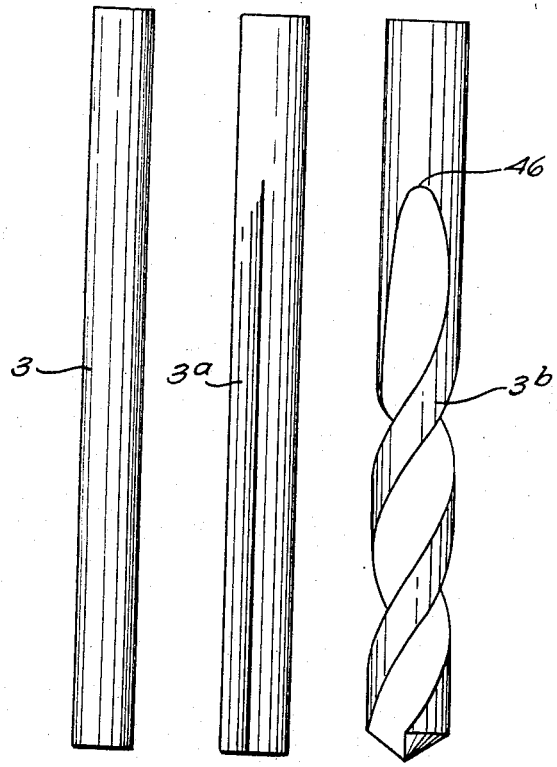
Fig. 8ª Fig. 9ª Fig. 10ª
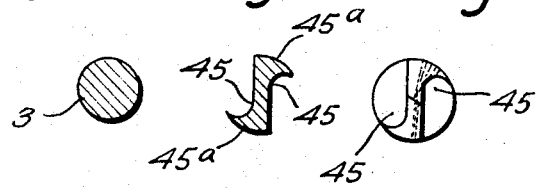
JOHAN ERIK BERGSTROM
INVENTOR.
BY
ATTORNEY.

United States Patent Office 3,427,844
Patented Feb. 18, 1969

3,427,844
PROCESS AND AN APPARATUS FOR THE MANUFACTURING OF SPIRAL DRILLS
Johan Erik Bergström, Fjallro, Frovi, Sweden
Filed Apr. 23, 1963, Ser. No. 274,979
Claims priority, application Sweden, June 25, 1962,
7,072/62
U.S. Cl. 72—64
Int. Cl. B21d *11/14;* B21k *5/04*
4 Claims As a rule spiral drills are manufactured by providing a drill blank in the form of a cylindrical bar with milled grooves. However, said process is expensive and involves cutting of a large amount of the raw material which usually is expensive.

It has also been suggested to shape the spiral grooves without cutting, that is to say by hammering according to a special process by the aid of hammers, which are especially designed and movable radially to the surface of the drill blank. However, the result achieved has not been satisfactory because the shape of the groove was inaccurate and a careful subsequent machining by profile grinding and sometimes also by cutting was necessary. Furthermore it often occurred that fractures and weakenings arose due to the violent mechanical treatment.

It is an object of the present invention to eliminate the above-mentioned disadvantages by shaping the spiral groove in two steps, that is to say a first step in which the surface of the drill blank is treated by hammering with at least two pairs of hammers, each pair consisting of two movable hammers which are positioned diametrically opposite to each other and are moved towards each other, the first pair of hammers (the groove hammers) shaping in the drill blank two axial grooves diametrically opposite to each other, while the drill blank successively is travelling axially past the hammers. Approximately at the same time the second pair of hammers likewise by a hammering action perpendicularly to the action of the groove shaping hammers will act on the portions of the drill blank between the grooves in order to prevent or reduce the tendency of flowing of the material of the drill blank caused by the action of the groove hammers. In a second step the drill blank, thus provided with axial grooves, is twisted around its axis so that said grooves will form two spiral or helical grooves having a desired pitch.

Since the aforesaid second pair of hammers squeeze the intermediate surfaces of the drill blank practically simultaneously as the groove shaping hammers successively hammer out the grooves it is achieved that fractures and deficiences on account of flowing of the material will be avoided. Thus the final spiral groove will obtain a perfect shape substantially without burrs so that as a rule no subsequent grinding is necessary. The successive processing along the length of the drill blank also results in sparing the material to a high degree. Contributing to this result is also to a substantial degree that the spiral shaping of the grooves by twisting is effected in a separate subsequent step, which can be performed independently of the hammering process and facilitates the desired adjustment of the pitch. Preferably the twisting of the grooves is effected successively in the longitudinal direction of the drill blank.

The invention also relates to a machine for performing the process.

One embodiment of the invention is illustrated on the accompanying drawings, in which.

Figure 4:
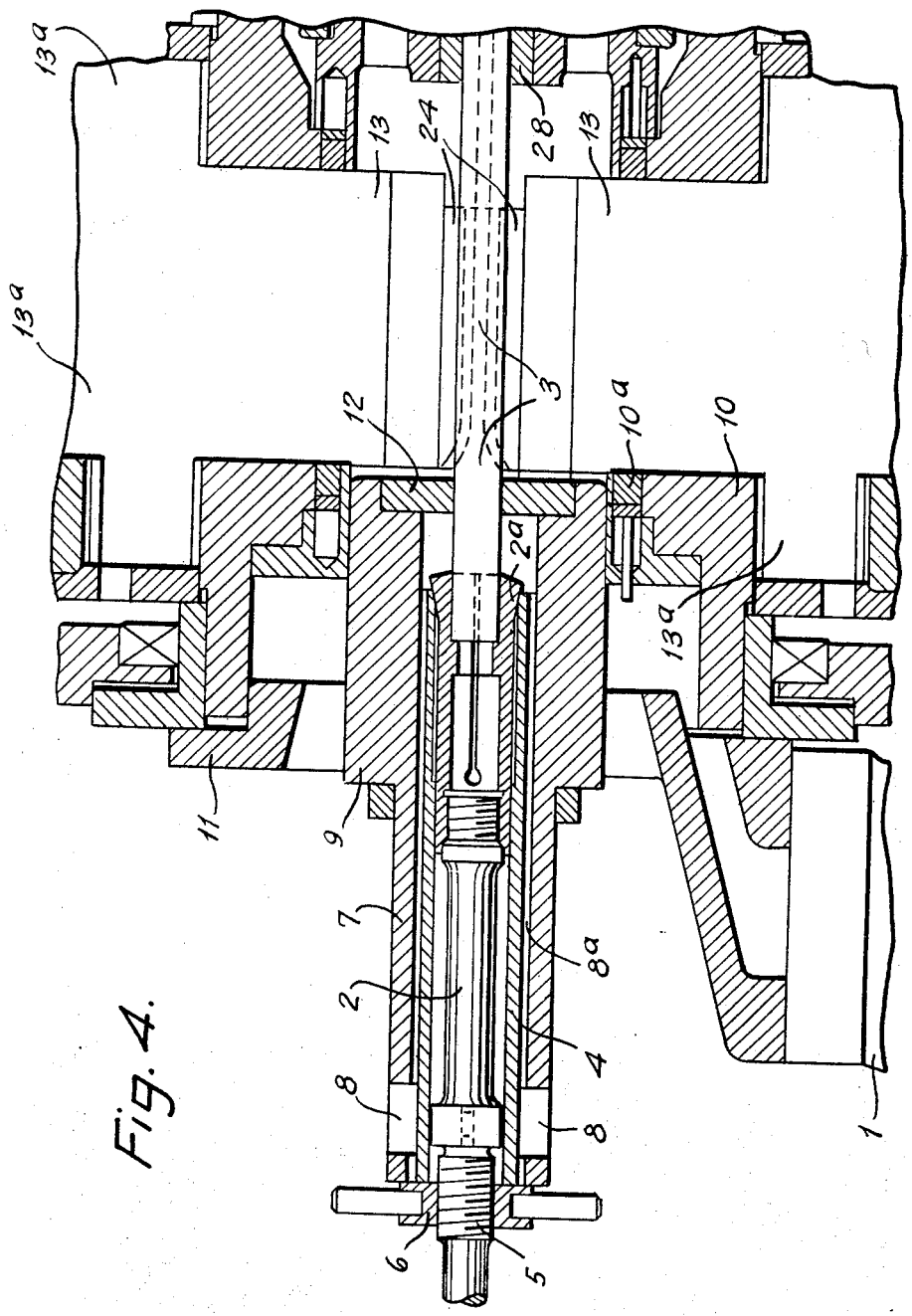
FIG. 4 is an axial section through the input side of the machine on a larger scale.
Figure 5:
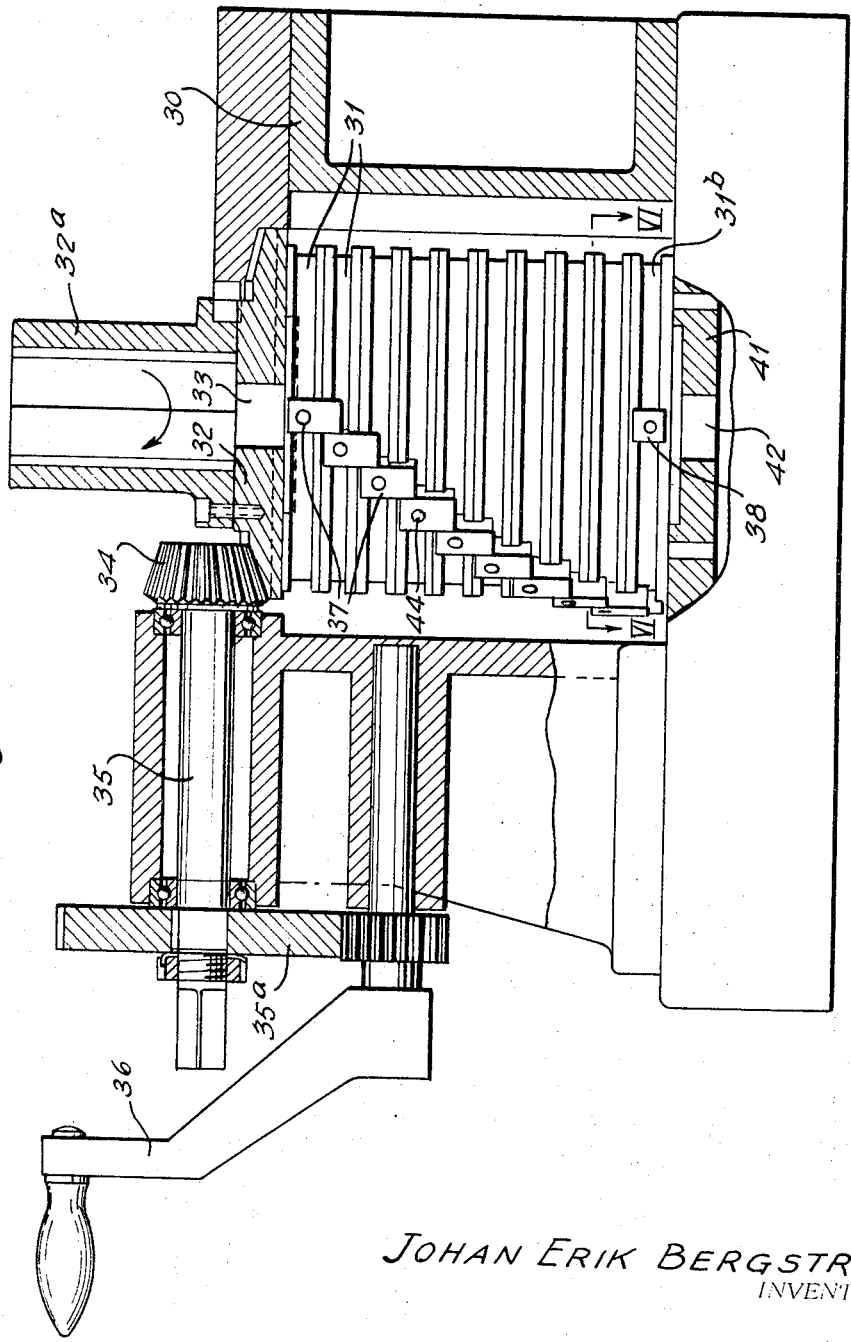
FIG. 5 shows the twisting machine, partly in a vertical section.
Figure 6:
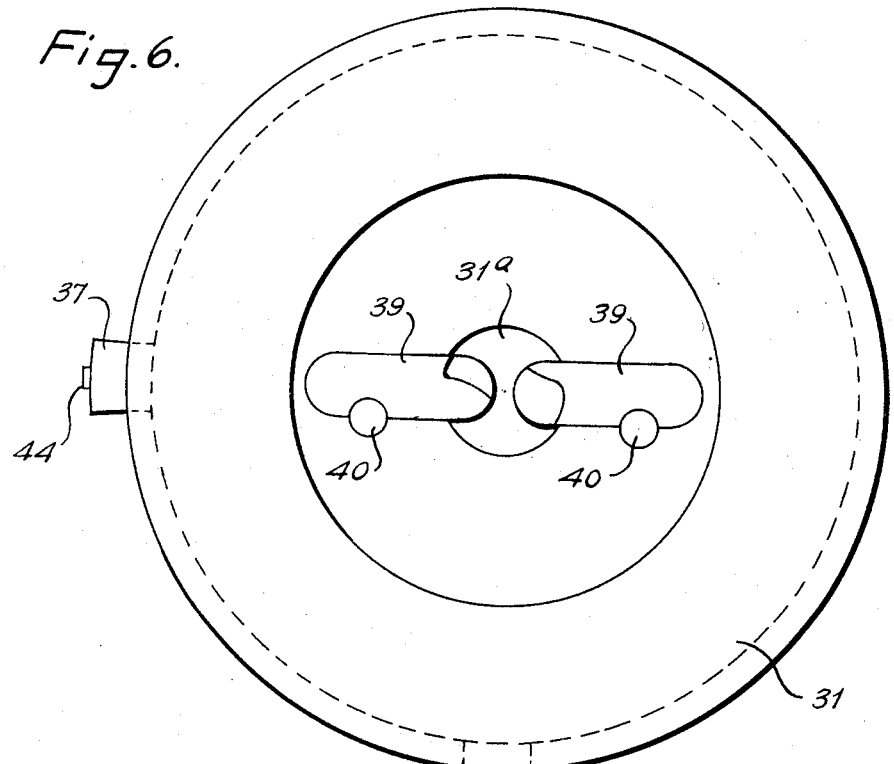
FIG. 6 is a horizontal section along the line VI—VI in FIG. 5 and shows a component of the twisting machine on a larger scale.
Figure 7:
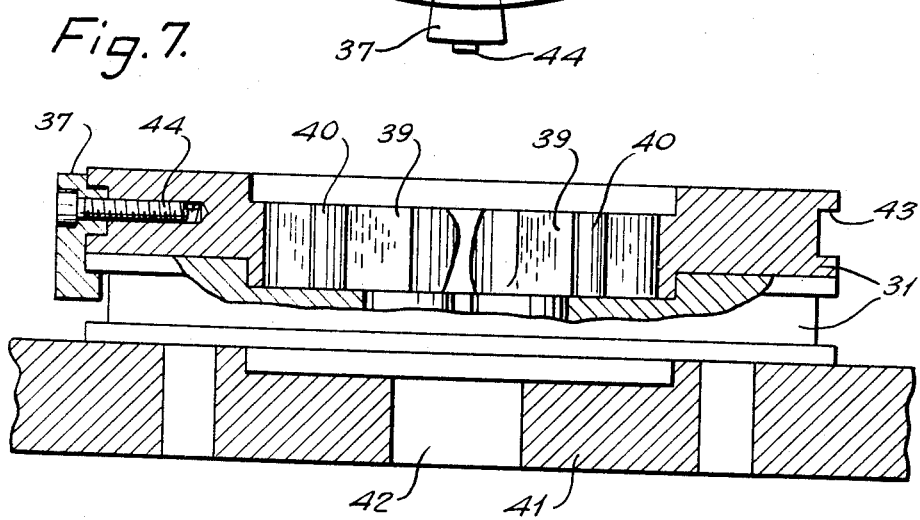
FIG. 7 is a vertical section of the component of FIG. 6.

FIGS. 8, 8a, 9, 9a, 10, and 10a are external views and cross sections of the drill blank at different processing stages, that is to say FIG. 8 shows the original cylindrical rod-shaped drill blank, FIG. 9 shows said blank after two opposite axial grooves having been shaped therein by means of the machine according to FIGS. 1–4; and FIG. 10 shows the drill with said grooves after having been twisted in the twisting machine according to FIGS. 5–7, whereby the grooves have been spirally shaped.

Figure 1:
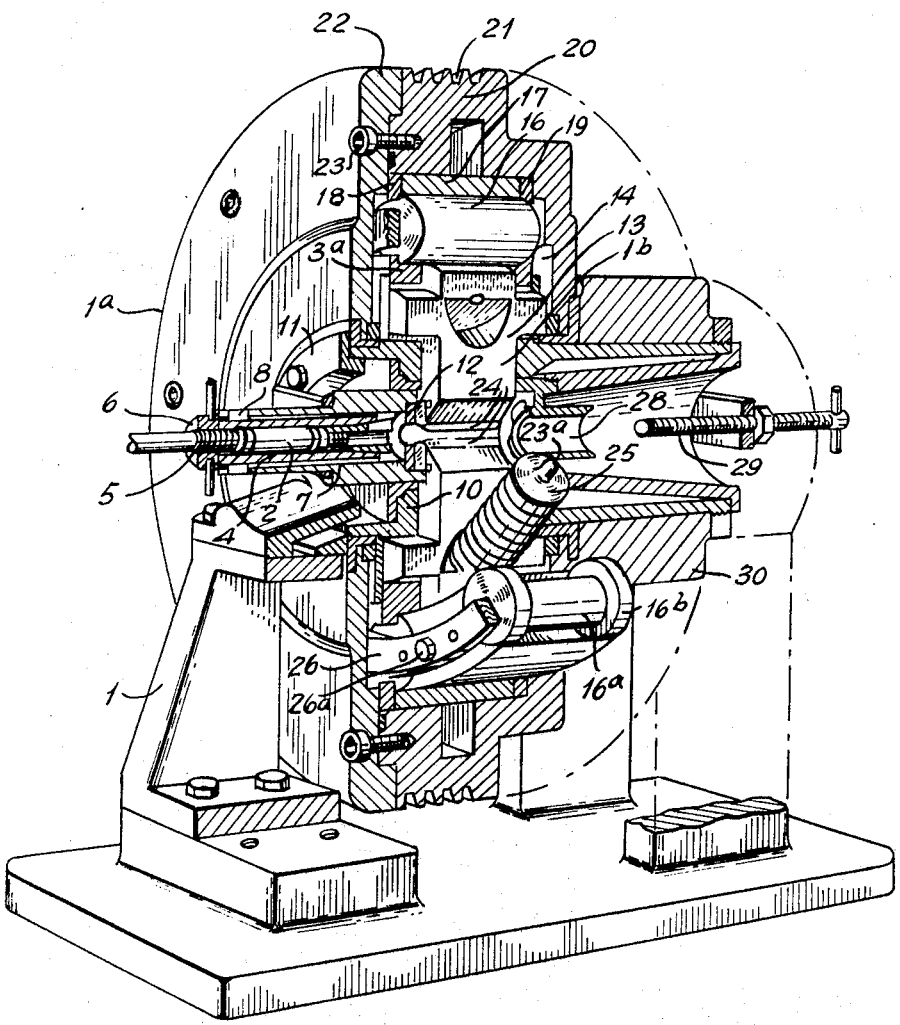
FIG. 1 is a total view, partly in section, of a machine for shaping grooves in a drill blank by hammering processing.

As shown in FIGS. 1–4 the hammering machine mainly comprises a base plate or frame 1, supporting a cylindrical body 1a, which can rotate around a non-rotatable stationary part 1b including the hammering elements or the hammers 24, 24a. The cylindrical rod-shaped drill blank 3 (FIGS. 4 and 8) to be processed in the machine, is first inserted into a chuck-like clamping sleeve 2 which is resilient in one end due to an axial slot and in which the drill blank is secured by rotating a nut 6 screwed on a threaded part of a spindle 5, thus causing a conical expanding element 2a to bias one end of a surrounding tube 4. Parts 2, 2a, 4, 5 and 6 as well as the drill blank 3 secured therein form a unit, which first is introduced into a heating furnace for heating the drill blank to a temperature suitable for the hammering processing, whereupon said unit is introduced into a receiving tubular feeding-in sleeve 7 of the machine. In said sleeve 7 there are guiding elements 8 which are received in axial straight grooves 8a in the outer surface of the tube 4 in order to prevent the unit (2, 2a, 3, 4, 5 and 6) from rotating. The unit is shown in FIGS. 1 and 4 in its innermost position, but on starting the process it is situated at an outward position in the feeding-in sleeve 7 and during the processing the unit is successively displaced inwardly so that the hammers 24 and 24a will hammer successively onto the drill blank 3 longitudinally thereof. The inner part 9 of the feeding-in sleeve 7 is fitted and secured in a bracket 10 having sealing elements 10a. In its turn the bracket 10 is fixed by an outer annulus 11 and in order to guide the drill blank 3 it has at its inner end a washer 12 with a central aperture (FIG. 4).

By a manually or, if desired, automatically controlled pressure in axial direction on the spindle 5 the drill blank is fed between the said hammering elements or hammers 24 and 24a, which each is fixed to the inner end of a hammer support 13, displaceable and guided in radial direction. There are four hammer supports which are arranged in two pairs at right angles to one another, the supports 13 of each pair moving towards and from one another. The hammers 24 and 24a proper are also arranged in pairs, both pairs having processing surfaces of mutually different shape. Thus, one pair consists of two opposite hammers 24 (groove hammers), adapted to shape two axial grooves 45 (FIG. 9) in diametrically opposed faces of the drill blank, whereas the second pair of hammers 24a is adapted to shape the facet or clearance surface 45a between the grooves of the drill blank. It is of importance that the two pairs of hammers act on the face of the drill blank approximately simultaneously in order to prevent the material of the blank from flowing or creeping. However, the groove hammers 24 should have a somewhat greater stroke length than the clearance hammers 24a because the first-mentioned hammers are to penetrate deeper into the material of the drill blank.

The hammers 24 and 24a may for instance be fitted in slots shaped as dovetails in the ends of the supports 13 and may be secured exchangeably by means of wedges.

Figure 2:
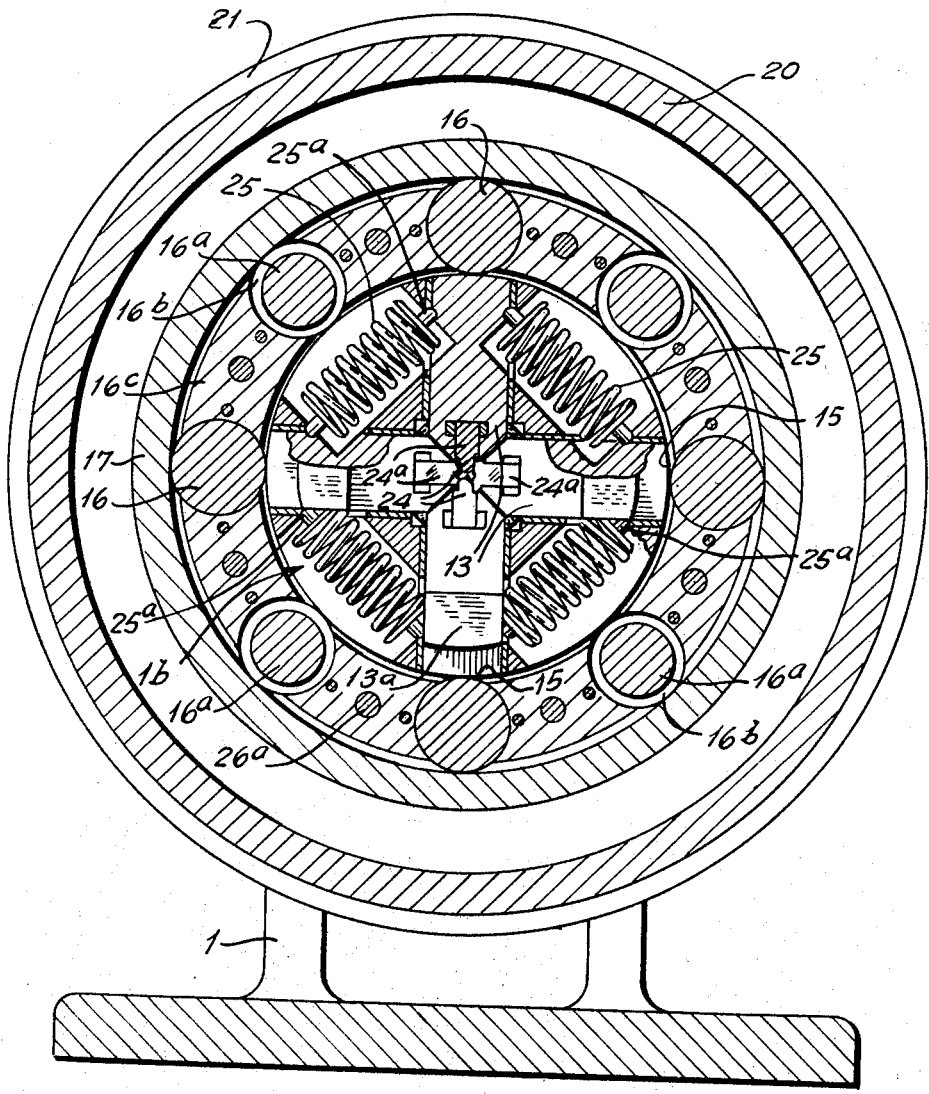
FIG. 2 is a vertical section of the machine perpendicularly to its axis.
Figure 3:
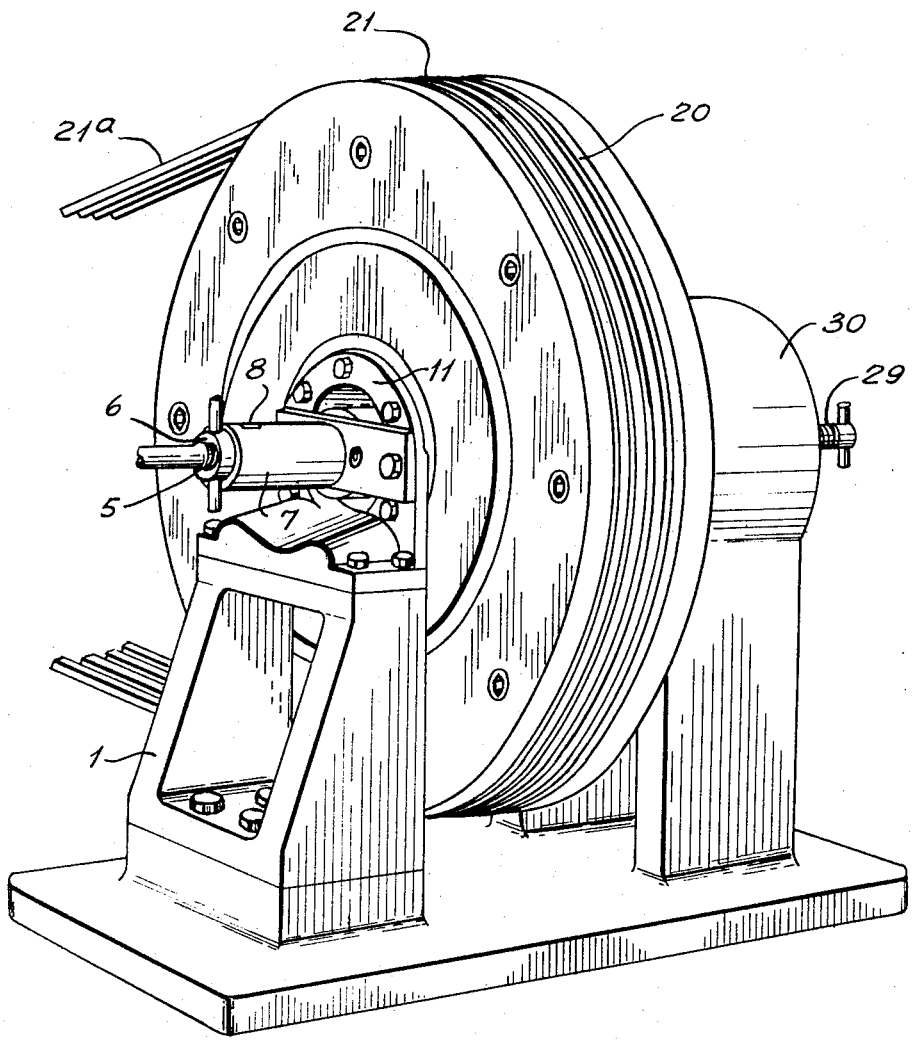
FIG. 3 is a perspective external view of one end of the machine.

Each of the supports 13 is guided radially by shoulders 13a in a guide 14 (FIG. 1) in a cylindrical body. The outer end or head 15 of the support 13 is slightly curved in conformity with a curve carefully adjusted to actual hammering movement. For achieving the desired different hammering or percussion movement of the hammers 24 and 24a respectively the curve for the supports 13 supporting the hammers 24 has a different shape as compared with the curve for the supports 13 supporting the hammers 24a. Preferably the arrangement is such as to cause the clearance hammers 24a to reach the face of the drill blank somewhat earlier than the groove hammers 24. For the above-mentioned radial hammering movement the heads 15 of the hammer supports 13 are actuated by actuating elements, for instance in the form of pulleys 16, journalled rotatably in a ring 16c, which can rotate around its center (FIG. 2). The pulleys are journalled between an outer ring 17 and the abovementioned inner part 3a in such a manner that on rotation of the ring 16c they will act upon the respective support heads 15 and tend to urge the supports radially inwardly in their guides. This inward movement is counteracted by obliquely outwards acting springs 25, inserted between the supports 13 and tending to return them outwards. The ends of the springs have pegs 25a to be received in recesses 27 in the hammers. There are four pulleys 16, one for each hammer's support 13. However, in order to improve the guiding of the ring 16c there are other pulleys 16a journalled between the first pulleys and having a smaller diameter and provided with flanges 16b at their ends. Said pulleys 16a do not actuate the heads 15 of the supports. Thus, through the action of the pulleys 16 each support 13 will perform four hammering movements for each revolution of the ring 16c. A ring 26 with bolts 26a connects the pulleys and the ring 16c. Lateral rings 18 and 19 afford the required guiding in a lateral direction. The rotation of the above-mentioned rotating pulley unit is effected for instance by an outer belt pulley 20 connected to the part 22 of the outer cylinder 1a by means of bolts 23 and provided with V-shaped grooves 21 for V-belts 21a (FIG. 3), for instance. Of course the rotation can also be effected in another manner.

The function of the machine should be clear from the above description. The processing of the two axial and diametrically opposed grooves 45 in the drill blank 3a (FIG. 9) by the hammering or percussion action of the hammers 24 while the clearing hammers 24a simultaneously act on the blank starts at the inner end of the drill blank and continues successively along the drill blank as it is displaced axially and enters a receiving sleeve 28. If desired an adjustable limit stop 29 can be provided. When the desired length of the drill blank has been provided with axial grooves the drill blank is withdrawn together with the clamping sleeve 2 in the opposite direction.

It is, however, also easy to arrange that after completion of the grooves 45 the drill blank will be displaced straight through the machine and withdrawn at the end opposite to the tube 7. In this case the hammers 24 and 24a must, of course, be retracted. In this manner it is possible to arrange for a continuous manufacturing process.

The machine now described shapes grooves 45 without any objectionable burrs and without fractures which is of a great importance for the final manufacturing of the drill.

Spiral grooves now have to be made from the straight grooves 45. To this purpose the drill blank 3a, if desired after an intermediate heating, is introduced into a twisting machine (FIGS. 5–7). This machine mainly consists of a base 30 in which a pile of disc elements 31 (for instance nine) are journalled rotatably. The lowermost disc, which is designated 31b, is constructed similarly to the upper discs 31 but is fixedly secured to the base plate 41 of the twisting apparatus. The top of said pile terminates by a driving toothed gear 32 with a conical toothed rim around its periphery meshing with a conical gear 34 which can be rotated by means of a shaft 35 and a handle 36, if desired through the intermediary of a gearing 35a. The device may also be driven by a motor. The disc elements are also rotatable separately and each of them is provided with mutually displaced shoulders or dogs 37 in two rows mutually displaced by a suitable angle. In the drawing, FIG. 5, only one of said rows of dogs is shown for the sake of clarity; the second row of shoulders on each of discs 31 is imagined to be displaced at such angle from the first one. The lowest, fixed disc 31b, however, has only one fixed shoulder or dog 38. The top disc element is secured to the driving gear 32 and is rotated by the latter, for instance in a clock-wise direction, until the trailing shoulder of said element engages the leading shoulder of the next lower disc element, the latter shoulder (not shown on the drawing) being displaced at said chosen suitable angle, whereby the last-mentioned disc element will be entrained in the rotation and after turning through such angle will engage the next lower disc element etc. until all disc elements have been turned. Thus, in said manner a successive rotation of all disc elements is achieved.

Each disc element 31 is provided with a central hole 31a corresponding to a central hole 33 in the driving gear 32, all said central holes forming a passage or duct. A base plate 41 arranged under the pile of discs has a similar central passage 42. Each disc element supports two diametrically opposed gripping elements 39, which are secured by pins 40 and have a shape similar to the groove hammers 24.

The drill blank 3a provided with grooves 45 and held by the parts 2, 2a, 4, 5 and 6 and in this condition withdrawn from the processing machine previously described, is inserted into the guide 32a, the hole 33 and the underlying holes 31a–42, whereby the gripping elements 39 will engage the grooves 45 so as to guide the drill blank. At the same time, the guide 32a affords a centering of the shaft of the drill blank relative to the spiral. By the successive rotation of the disc elements described also the drill blank will be twisted successively so that finally the grooves obtain an even spiral shape as shown on the drill blank 3b in FIG. 10. Said successive perfectly evenly progressive twisting of the drill blank is necessary in order that the drill blank shall get a perfectly even shape and in order to reduce the necessary twisting or torsional power. Those parts of the drill blank which are not twisted in a certain moment are secured and guided by the gripping elements 39 in the disc elements 31 which not yet are entrained in the rotation. It has been found that by proceeding in the manner described a very perfect spiral groove will be obtained, which often does not require any subsequent grinding except at the point of the drill. At the opposite end 46 the spiral groove extends axially and terminates smoothly into the cylindrical surface of the drill blank. This axial part is more advantageous than the spiral shaped end portion of the spiral groove of known drills because the axial portion facilitates removal of borings, chips, etc.

The distance between the two abovementioned rows of shoulders (one only is shown on the drawings) may be varied by adjusting each shoulder 37 and securing it in its position in a peripheral groove 43 (FIG. 7) by means of a screw 44. The larger the distance between the rows of shoulders the smaller is the pitch of the spiral groove and thus in this manner it is possible to adjust said pitch from case to case. In similarity to the hammers 24 and 24a also the gripping elements 39 are easily exchangeable in order to be adjustable to drill blanks of different dimensions.

If desired the twisting machine described can be arranged with a horizontal central axis and be connected to the exit or discharge end of the hammering machine (FIGS. 1-4) for the purpose of rendering possible continuous manufacturing.

The clamping sleeve 2a shown in FIG. 4 is mainly used for the processing of cylindrical drills. For the manufacturing of spiral drills with a conical attaching end the clamping of the drill blank is modified in a suitable manner. After completing processing in the hammering machine the parts 3, 2a, 4, 2, 5 and 6 are withdrawn and transferred to the twisting machine (FIGS. 5-7), if desired with an intermediate heating, the parts 3, 2a, 4, 2, 5 and 6 being introduced into the guide 32a according to FIG. 5. Parts 3, 2a, 4, 2, 5 and 6 are thus used in both machines.

FIG. 5 does not show any longitudinal stops (insertion stops), but such stops may be arranged alternatively from below through the hole 42 or from the top through the guide 32a or the conical gear 32.

The pitch of the spiral drill may vary along the length of the drill by adjusting the mutual position of the shoulders 37 of the twisting machine. Particularly it may be of interest to increase the pitch from the tip towards the shaft of the drill.

What I claim is:

1. A machine for twisting a grooved drill blank comprising a support, a pile of axially aligned disc elements, means mounting the disc elements on the support for rotation about their axes with respect to the support and each other, each disc element having an axial hole therethrough for receiving the grooved drill blank, each disc element having means affixed thereto providing a finger projecting generally radially into the hole in the disc and into a groove of the drill blank, means engaging the drill blank at one end thereof to retain it from rotation as the drill blank is being twisted, means positively to rotate the disc element at one end of the pile of disc elements, and lost motion driving means between said driven disc element and the next disc element in the pile, and between each successive pair of disc elements, said lost motion driving means being so constructed and arranged that successive disc elements from the driven disc to the other end of the pile rotates through a predetermined angle independently of the subsequent disc elements, and that after such predetermined angle of rotation each successive disc element becomes locked to and rotatably driven by the next preceding disc elements.

2. A twisting machine as claimed in claim 1, wherein the lost motion driving means between successive disc elements comprises interfering shoulder-providing means affixed to the disc elements.

3. A twisting machine as claimed in claim 2, wherein the shoulder-providing means are dogs affixed to the peripheries of the disc elements, each dog extending through a small angle peripherally of its disc element, the dogs of successive disc elements having portions which overlap in-planes transversely to the common axis of the disc elements.

4. A twisting machine as claimed in claim 3, comprising means securing the dogs to their respective disc elements for adjustment peripherally of such disc elements, whereby the pitch of the grooves of the twisted drill blank may be varied.

References Cited
UNITED STATES PATENTS

| | | | |
|---|---|---|---|
| 434,139 | 8/1890 | Taft | 76—108 |
| 1,499,797 | 7/1924 | Woods | 76—108 |

RICHARD J. HERBST, *Primary Examiner.*